United States Patent Office 3,091,517
Patented May 28, 1963

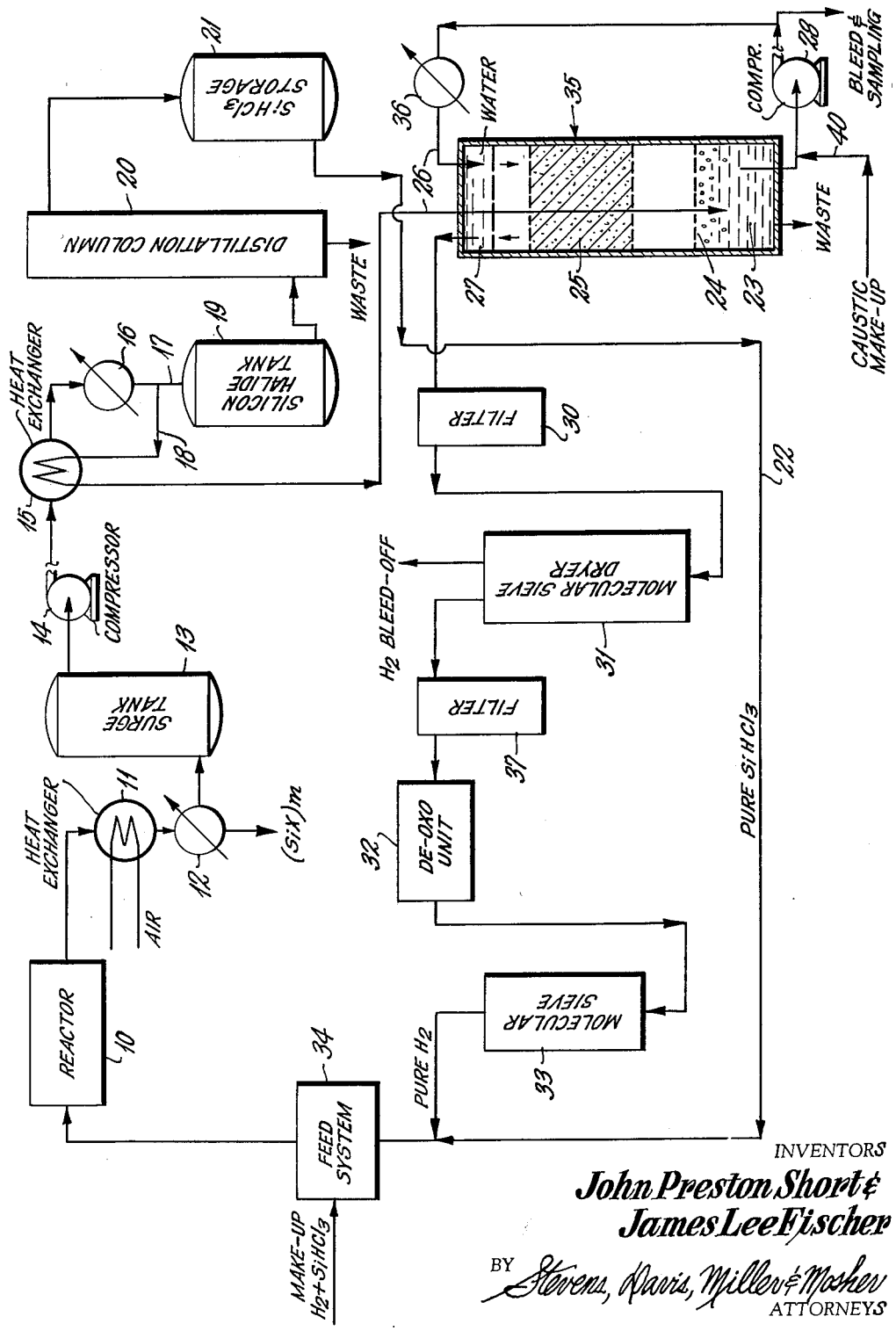

3,091,517
METHOD FOR RECOVERY AND RECYCLING HYDROGEN AND SILICON HALIDES FROM SILICON DEPOSITION REACTOR EXHAUST
John P. Short, Garland, and James L. Fischer, Dallas, Tex., assignors to Texas Instruments Incorporated, Dallas, Tex., a corporation of Delaware
Filed Nov. 25, 1959, Ser. No. 855,327
9 Claims. (Cl. 23—210)

This invention relates to processes for preparing extremely pure semiconductor grade silicon by the reduction of silicon halides with hydrogen.

More particularly, this invention relates to a method for recovering, purifying, and recycling hydrogen and silicon halides from silicon deposition reactor exhaust gases.

In the preparation of transistors, diodes, and other electronic devices from semiconductor materials, the purity of the semiconductor materials utilized is of primary importance. Recently, extensive research has been carried out in an effort to develop a process of producing pure silicon.

In copending U.S. application Serial No. 706,494, Adcock et al., filed December 31, 1957, now U.S. Patent 3,020,128, a method for producing high purity silicon is described. According to the method of the Adcock et al. application, purified trichlorosilane and purified hydrogen are reacted over a heated non-metallic surface at a temperature of approximately 1100° C. The halide is reduced to elemental silicon by the hydrogen, and the silicon is deposited out in a quartz deposition tube. The exhaust gases from the reaction consist of hydrogen chloride formed in the reaction, and any products which may be formed by side reactions, plus excess trichlorosilane and hydrogen not consumed in the reaction.

These exhaust gases are then passed to a cooler and condenser where the high-boiling point by-products are condensed and collected. The gas mixture is then passed through a molecular sieve where hydrogen chloride is removed. The residual exhaust mixture then consists primarily of hydrogen and trichlorosilane which may be recirculated for reuse in the reaction.

The present invention constitutes an improvement in the method of recovering, purifying, and recycling the desirable components of the exhaust gases from the reaction forming the basis for the Adcock method of producing high purity silicon. By the process of the present invention, the hydrogen and trichlorosilane in the exhaust gas from the reaction are individually recovered in a highly purified state, and may then be combined in the proper proportion and recirculated to the reactor.

In its broadest aspect, the method of the present invention comprises the steps of stripping the less volatile components from the silicon reactor exhaust gases, compressing and cooling the remaining gases of the exhaust gas mixture to condense most of the silicon halides from the mixture, and caustic scrubbing the remaining gases to remove substantially all hydrogen chloride and residual silicon halides and leave substantially only wet hydrogen.

The broad general procedure enumerated yields silicon halides of sufficient purity that they may be recirculated to the reaction without further purification when silicon of grade adequate for certain semiconductor types is to be produced. However, the silicon halides recovered in the first step of the process may be further purified and particular chlorides, such as trichlorosilane, may be isolated in a high state of purity by fractional distillation of the type described in the Adcock application referred to above.

The caustic scrubbing procedure of the present invention yields wet hydrogen from which substantially all of the entrained HCl and residual silicon chlorides have been removed. The hydrogen may then be dried and further purified to remove entrained oxygen, and then recycled to the reactor.

Previous efforts to utilize a caustic to scrub gases containing silicon compounds encountered considerable difficulty due to the formtaion of gelatinous silicates and the precipitation of $SiO_2$ which tended to plug or stop up the packing of the scrubber column. This disadvantage often necessitated the use of spray scrubbing systems in preference to the packed-column type of scrubber. Even in spray scrubbing systems, however, partial plugging of spray nozzles with a gelatinous deposit often results with consequent reduced efficiency of the scrubbing process. In any type of scrubbing system which is utilized to remove the hydrogen chloride and silicon chlorides from the hydrogen stream, it is extremely important that complete neutralization of these substances be accomplished due to materials and construction considerations downstream from the scrubber.

The caustic scrubbing technique of the present invention eliminates the disadvantages arising from the deposition or precipitation of gelatinous silicate materials in the scrubber column, and is characterized by the further advantage that it permits adequate scrubbing and recovery of hydrogen from any hydrogen-silicon halide-hydrogen chloride mixture in any concentration. The only requirement is that the silicon halide be hydrolyzable.

The salient features of the caustic scrubbing technique utilized in the present invention comprise introducing the hydrogen-halide mixture beneath the surface of a reservoir of liquid caustic, and then passing the gaseous mixture which bubbles from the surface of the caustic reservoir upward through a packed column countercurrent to a percolating caustic solution having a pH greater than 12 while maintaining a high gas pressure in the column.

It is an object of this invention, therefore, to provide a method of scrubbing a gaseous mixture of hydrogen, hydrogen chloride, and silicon halides to remove the hydrogen chloride and silicon halides from the mixture without the formation of solid materials.

It is a further object of the present invention to provide a method for separating trichlorosilane from a gaseous mixture of trichlorosilane, hydrogen, hydrogen chloride and other silicon chlorides.

It is a further object of the present invention to provide a method for individually reclaiming hydrogen and trichlorosilane from the exhaust gases of a reaction in which trichlorosilane is reduced by hydrogen to elemental silicon.

These and further objects of this invention will become more readily apparent as the following description proceeds.

The drawing is a schematic flow diagram of the entire system utilized for recovering silicon halides and hydrogen from the reactor exhaust gases, and then purifying and recirculating these materials to the reaction.

Referring now to the drawing, a reactor for the production of silicon of the type disclosed and claimed in Adcock application Serial No. 706,494, referred to above, is indicated by the numeral 10. Exhaust gases from the reaction comprise a mixture of approximately 4% silicon halides, 1% HCl, and 95% hydrogen. The total flow of exhaust gases is approximately 800 liters per minute at standard temperature and pressure, and the gases are exhausted from the reactor at approximately 1100° C.

After leaving the reactor, the exhaust gases are passed to an air-cooled heat exchanger 11 where they are cooled to about 500° F. From the air cooler 11, the gases pass to a condenser 12, through which refrigerated water is circulated at a temperature of approximately 55° F. High boiling point constituents of the exhaust gases, which have been indicated by the general formula $(SiX)n$, are here condensed, and are bled from condenser 12 into a receiver, not shown.

The remaining gases then leave the condenser at about 70° F., and pass through a surge tank 13 of approximately three-minute holding capacity and into a compressor 14, preferably of the diaphragm gas pump type. In the compressor 14, the gases are compressed to approximately 200 p.s.i.g. Simultaneously, the gas is cooled to approximately 200° F. by means, not shown, for circulating refrigerated water through the head of the compressor. This cooling cycle is required because the compression cycle causes the gas to be heated.

After the gases are compressed and cooled in compressor 14, they are further cooled in a heat exchanger 15 by cold gases exhausted from the low temperature condenser 16 further down stream, as will be better understood when that element is considered. The gases leave heat exchanger 15 at approximately 80° F., and the condensate which is formed in this heat exchanger is allowed to flow with the gases into low temperature condenser 16. The coolant utilized in the condenser is Freon from a commercial refrigeration system not shown. The Freon is circulated through low temperature condenser 16 at a temperature of about —55° F. Approximately 85% to 95% of the silicon halides in the stream of exhaust gases from the reactor are condensed out, and drain via conduit 17 into a silicon halide recovery tank 19.

The gases which are not condensed out in condenser 16, consisting predominantly of hydrogen, with some hydrogen chloride and very small amounts of silicon halides entrained, leave the condenser at approximately —10 to —20° F., and are passed via conduit 18 back through heat exchanger 15 where they absorb some of the heat from the upstream exhaust gas mixture, as mentioned above.

The liquefied silicon halides which accumulate in halide recovery tank 19 may be circulated from this tank to a precision distillation column 20 where the various halides are separated and purified. In the flow diagram of FIGURE 1, trichlorosilane, which has been indicated as a preferred reactant in the preparation of silicon by the Adcock method, is cut from the distillate of column 20 and passed to a trichlorosilane storage tank 21 where it is stored pending subsequent recycling to the reactor.

As an alternative to this procedure, cuts of several types of purified silicon halides, such as trichlorosilane and silicon tetrachloride, which are suitable for reaction with hydrogen to produce ultra-pure silicon, may be collected from distillation column 20 and stored in tank 21, and subsequently recycled to the reactor.

It has been found in practice that it is even possible to produce silicon of sufficient purity for some types of semiconductor devices by recycling the silicon halide mixture collected in halide recovery tank 19 directly to the reactor.

After the cold exhaust gases from condenser 16 have been circulated through heat exchanger 15, they pass to the caustic scrubber unit, designated generally 35, where they are introduced from one to three feet below the surface of a liquid caustic reservoir 23, at the bottom of the scrubber. The caustic solution in the reservoir is NaOH solution of approximately 0.5% concentration. The gases introduced below the surface of the reservoir bubble upward through the caustic and the gas bubbles are dispersed and broken up by a suitable turbulizer 24 such as a screen, etc. Passage of the gas through the liquid reservoir is effective to remove most of the silicon halides remaining in the gas and some of the hydrogen chloride.

After the gas is expelled from the liquid reservoir, it passes upwardly through a packed section 25 of the column, and is further scrubbed. The whole scrubbing column 35 is preferably made of P.V.C.-lined steel. The packed section is about 4 feet long, and is packed with Raschig rings cut from quarter-inch P.V.C. pipe. A 1% to 2% caustic solution is introduced at the top of the column from line 26, and is allowed to percolate down through the packed section countercurrent to the ascending gases. In passing through the packed section of the column, the gas is effectively scrubbed to remove practically all of the entrained HCl and silicon halides which remain in the process stream.

In order to prevent precipitation of gelatinous silicates in the column and in the reservoir, it has been found necessary to maintain the pH of the caustic solution above 12, which corresponds to a caustic concentration of 0.04%. Introduction of a 1% to 2% caustic solution from line 26 at the top of the column will maintain the solution in the column at the desired pH and prevent such precipitation. In such case, the waste caustic solution at the bottom of the reservoir 23 will discharge at less than 0.5% concentration.

The caustic scrubbing arrangement in the drawing includes a system in which caustic from the reservoir is recycled from the reservoir to the top of the scrubbing column via pump 28. In this manner, higher utilization of caustic is realized than when the scrubber is operated on a straight-through basis. However, when reservoir caustic is recycled, care must be exercised to avoid a decrease in concentration of the caustic fed from line 26 of such magnitude that precipitation of $SiO_2$ and gelatinous silicates occurs in the column and reservoir. To this end, a caustic make-up line 40 is provided for introducing fresh caustic to the recirculated caustic stream. At the same time, some waste caustic from the reservoir is continually removed to keep the over-all concentration of dissolved silicates and sodium chloride below the level of precipitation.

Where circumstances dictate, the packed section of the scrubber column may be replaced by a spray scrubber section if desired, provided the high pH and initial reservoir scrubbing features are used.

The input temperature of the gases as they are introduced to the caustic reservoir are not especially important. However, it is desirable to have the scrubbed hydrogen exit from the caustic scrubber in a cooled state and under considerable pressure, since under these conditions a minimum amount of moisture will then be contained in the hydrogen stream. Since the entire system is a substantially closed system, the pressure introduced in the system by compressor 14 will be effective to maintain considerable pressure upon the hydrogen recovery system. The cooling of the hydrogen passing through the scrubber is effected by introducing cooled caustic to the unit. A caustic to chilled water heat exchanger, 36, effects this cooling.

As has been previously pointed out, this caustic scrubbing system is a versatile one in that it can adequately scrub and recover hydrogen from any hydrogen-silicon halide-hydrogen chloride mixture at any concentration with the only requirement being that the silicon halide be hydrolyzable. Most of the silicon halides fall within this requirement.

After the hydrogen has been scrubbed by passage through packed section 25, it leaves the scrubber column by way of a demister section 27 in the top of the column which may consist of another packed section.

The gas then passes through a filter 30 to remove any liquid or solid matter and into a molecular sieve drying unit 31 which is designed to lower the dew point of the hydrogen gas to approximately —110° F.

To insure that impurities do not build up in the system, about 10% of the hydrogen passing through the molecular sieve dryer is bled off. If the molecular sieve drying unit 31 is of the double-column type, the hydrogen which is bled off can be used to regenerate that side of the double column molecular sieve which is not in use.

The gas leaves the molecular sieve dryer and passes through filter 37 which removes any dust picked up from the molecular sieve 37. The gas then proceeds to a catalytic deoxygenation unit 32, such as the type commercially available under the trade name "De-Oxo." The deoxygenation unit converts entrained oxygen to water which is removed in a second molecular sieve column 33. The clean pure hydrogen is then recycled to the reactor 10 after necessary make-up hydrogen and trichlorosilane or silicon halide mixture has been added to the stream via feed system 34.

The following examples are illustrative of the results obtained utilizing the method and apparatus of the present invention.

*Example I*

Exhaust gases from a silicon reactor of the type described in the copending Adcock application comprised a mixture of 4% silicon halides, 1% hydrogen chloride, and 95% hydrogen. The exhaust gas left the reactor at a flow rate of 800 liters per minute, S.T.P., and at a temperature of 1100° C. and a pressure of 1.5 p.s.i.g.

The reactor exhaust gas was initially cooled in an air-cooled heat exchanger, corresponding to heat exchanger 11 of FIGURE 1, to a temperature of approximately 500° F., and was then further cooled to about 70° F. in a condenser using refrigerated water as a cooling medium. This condenser stripped out 0.02% of the exhaust gases comprising high-boiling waste constituents.

The uncondensed gas was then led to a diaphragm compressor and was compressed to 175 p.s.i.g., and simultaneously cooled to about 200° F. by refrigerated water circulating through the compressor head.

The gas from the compressor was then cooled to just below room temperature in a heat exchanger by gas recycled through the heat exchanger at 0 to 15° F. from the low temperature refrigerated condenser downstream.

A small amount of liquid which condensed in the heat exchanger was passed with the gases cooled therein to a low temperature condenser through which Freon at —55° C. was circulated. The gases were effectively cooled to approximately 5° F. in the condenser and the gaseous mixture exhausted from the condenser contained approximately 0.8% silicon halide, 1% HCl, and the rest hydrogen. Of the contained silicon compounds, 75% to 85% were condensed out. The trichlorosilane and silicon tetrachloride from the condensate were isolated and purified by distillation and re-used to make high-grade silicon. No degradation of silicon produced from the recycled silicon halides as compared to that produced from fresh distilled material has been noticed.

*Example II*

The condensate from the low temperature condenser of Example I was recycled directly to the silicon reactor. Silicon of fairly high purity was produced in this manner. Such silicon is sufficiently pure for utilization in some types of semiconductor devices such as, for example, solar cells.

*Example III*

In an effort to increase the efficiency of the stripping of valuable silicon halides from the exhaust gas stream, the gases passing through the compressor were compressed to 200 p.s.i.g., and the temperature of the condenser gases was lowered to —20° F. All other conditions of temperature, pressure, flow rate, etc. set forth in Example I were retained. With the lowered temperature and increased pressure of the gases in the low temperature condenser, it was possible to recover 85% to 95% of the silicon halides, an increase of about 10% over the amount recovered in Example I.

An example of the use of the caustic scrubbing technique of the present invention is as follows:

*Example IV*

The exhaust gas was passed from a silicon reactor at 15 liters per minute S.T.P. and at approximately 1100° C. It was cooled in an air cooler to approximately 500° F., and then passed through a cold trap condenser where about 50% of the silicon halides were condensed out. The remaining gas, consisting of approximately 94% hydrogen, 2% HCl, and 4% silicon halides was compressed from approximately 1 p.s.i.g. to 3½ p.s.i.g. The gas was then bubbled into a caustic scrubbing column which consisted of a packed Pyrex pipe approximately 5 feet long and 2 inches in diameter connected to a Pyrex pipe 18 inches long and 4 inches in diameter which was used as a liquid caustic reservoir. The packing utilized consisted of polyethylene tellurettes and the caustic solution of the reservoir was approximately 20% NaOH which was recycled to the top of the column. The gases from the compressor were bubbled 6 to 8 inches below the surface of the reservoir and passed upwardly through screens disposed in the caustic solution to act as turbulizers. An analysis of a sample of the gases bubbling from the surface of the caustic reservoir indicated that approximately 75% of the HCl and all of the silicon halides had been removed.

The gases leaving the caustic reservoir were then passed upwardly through the column-packing countercurrent to the recirculated caustic percolating downward through the packing. A demister section of Pyrex wool was placed in the top of the column, and the gas passed therethrough prior to leaving the column. Analysis of the hydrogen stream leaving the column indicated that effectively all of the HCl initially entrained had been removed by the scrubbing action.

After further purification of the hydrogen stream to remove residual water vapor and oxygen, the pure dry hydrogen was allowed to recycle back to the halide feed system. The recycled hydrogen, plus pure make-up hydrogen constituting about 10% of the total hydrogen stream was bubbled through chilled liquid silicon halide. A gaseous reactor charge stock containing approximately 10% of the halide resulted. The hydrogen-halide mixture was then charged to the silicon reactor. The silicon produced was of excellent grade and suitable for use in transistor fabrication.

In a typical run utilizing both the silicon halide recovery and recirculation system and the hydrogen purification and recovery system, the following conditions prevailed and results were obtained:

*Example V*

Exhaust act gases from a silicon reactor of the type described in the copending Adcock application comprised a mixture of 4% silicon halides, 1% hydrogen chloride, and 95% hydrogen. The exhaust gas left the reactor at a flow rate of 800 liters per minute, S.T.P., and at a temperature of 1100° C., and a pressure of 1.5 p.s.i.g.

The reactor exhaust gas was initially cooled in an air-cooled heat exchanger, corresponding to heat exchanger 11 of FIGURE 1, to a temperature of approximately 500° F., and was then further cooled to about 70° F. in a condenser using refrigerated water as a cooling medium. This condenser stripped out that portion of the exhaust gases comprising high boiling waste constituents.

The uncondensed gas was then fed to a diaphragm compressor, and was compressed to 200 p.s.i.g. and cooled to about —20° F. Approximately 87% of the silicon containing compounds were recovered. The recovered halide was distilled and the pure trichlorosilane, approximately one-half of the silicon compounds, was transported to the feed system 34 of FIGURE 1. This trichlorosilane, along with proper make-up trichlorosilane, was fed to the silicon furnaces.

The uncondensed gases comprising approximately 1% hydrogen chloride, 0.5% trichlorosilane, and the rest hydrogen, passed into the hydrogen recovery system. The gas was bubbled approximately two feet under the surface of a 0.5% liquid caustic solution in the bottom reservoir 23 of the scrubbing column 35. A screen was used to limit the size of the gas bubbles produced. The partially-scrubbed gas left the surface of the caustic solution, and passed through the packing 25. A caustic solution comprising approximately 1½% NaOH flowed down through the packing. This caustic was used on a straight-through basis with an excess above that needed for acid neutralization and solution of the silicon compound of about 30%. The incoming caustic was mixed in a tank (not shown), pumped to column pressure by pump 28, cooled to about 75° F. by heat exchanger 36, and sprayed onto the main pack section 25 at a point in the column below the demister section 27. The system pressure in the scrubbing column was approximately 180 p.s.i.g. All acids and silicon halides were stripped from the gas in the pack section. The gas left the packing section at 75° F. Entrained water was removed in the demister section. The line filter 30 was used to remove any traces of liquid or solid material in the gas stream.

The wet hydrogen gas was sent into a molecular sieve dryer 31. This dryer consisted of two columns, one column being regenerated while the second column is used for drying the gas. Approximately 10% of the gas leaving the drying column was used to regenerate the other column and then bled off. This dryer is a commercial model which may be regenerated using dry purge gas and a difference in pressure without the requirement for heat. The dew point for the gas leaving the dryer was approximately −100° F.

The gas then passed through a filter 37 to remove any solid particles picked up in the molecular sieve 31. The gas then went through a commercial "De-Oxo" unit 32, and then to a second molecular sieve dryer 33. The gas then went to the furnace feed system where it was combined with the recycle and make-up trichlorosilane and make-up hydrogen, reduced to reactor feed pressure and fed back into the silicon reactor system.

The silicon produced by this method and process was excellent for utilization in semiconductor devices. Typical silicon analysis was P-type resistivity 75 to 100 ohm centimeters with a boron level of approximately 2 parts per billion.

The above examples are intended to be illustrative of the novel process and apparatus of the present invention, and not as limiting the scope thereof. For example, system temperatures and pressures for both phases, that is, hydrogen recovery and silicon halide recovery, are rather flexible. As previously noted in Examples I and II, higher pressures and lower temperatures increase the yield of silicon halides recovered. Therefore, the pressures and temperatures actually employed at that stage of the process may be economically balanced against the value of the recovered materials.

The concentration of caustic solution used is also somewhat flexible within economic limitations, the only technical limitation being that the pH of the solution be greater than 12 in order to prevent precipitation of gelatinous silicates.

In view of these permissible variations in the conditions pertaining throughout the system during the utilization of the present invention, no limitation of the scope of the invention is intended except as set out in the appended claims.

What is claimed is:

1. The method of recovering and purifying hydrogen and silicon halides from a gaseous mixture containing those substances and hydrogen halide which comprises cooling the gaseous mixture to a sufficiently low temperature to condense those components of the mixture boiling at a higher temperature than said silicon halides, compressing and cooling the remaining components of said gaseous mixture to condense a major portion of said silicon halides therefrom, bubbling the uncondensed gas through a body of liquid caustic maintained at a pH greater than about 12 to prevent precipitation of solid silicon materials, passing the uncondensed gas from said liquid caustic countercurrent through a downflowing caustic solution having a pH greater than about 12 to prevent precipitation of solid silicon material, and finally removing water vapor and oxygen from said uncondensed gases to leave substantially pure hydrogen.

2. A method of producing silicon by reducing silicon halide with hydrogen in a reaction zone, purifying the unreacted silicon halide and hydrogen exhausted from said reaction zone, and recycling the purified unreacted silicon halide and hydrogen to said reaction zone comprising the steps of contacting the silicon halide and hydrogen at an elevated temperature in the reaction zone whereby said silicon halide is reduced to silicon; exhausting from said reaction zone a gas stream consisting of unreacted silicon halide and hydrogen, hydrogen halide, and by-products formed by side reactions, cooling said gas stream to condense high boiling point by-products, compressing and cooling said gas stream to condense a major portion of said silicon halide, removing said condensed silicon halide and recycling same to said reaction zone, bubbling said gas stream through a caustic reservoir having a pH greater than about 12 to remove substantially all of the remaining silicon halide and a portion of the hydrogen halide, passing said gas stream countercurrent to downflowing caustic having a pH greater than about 12 to remove all remaining hydrogen halide and any residual silicon halide and leave wet hydrogen, purifying said wet hydrogen and recycling said pure hydrogen to said reaction zone.

3. A method according to claim 2 wherein said condensed silicon halide is distilled and a fraction thereof is selected for recycling to said reaction zone.

4. A method according to claim 2 wherein said silicon halide is trichlorosilane.

5. A method according to claim 2 wherein more than 75% of the silicon halide is condensed from the gas stream by the step of compressing and cooling same.

6. A method of producing silicon by reducing silicon halide with hydrogen, purifying the unreacted silicon halide and hydrogen exhausted from said reaction zone, and recycling the purified unreacted silicon halide and hydrogen to said reaction zone comprising the steps of contacting the silicon halide and hydrogen at an elevated temperature in the reaction zone whereby said silicon halide is reduced to silicon; exhausting from said reaction zone a gas stream consisting of unreacted silicon halide and hydrogen, hydrogen halide, and by-products formed by side reactions, removing from said gas stream high boiling point by-products and a major portion of said silicon halide, bubbling said gas stream through a caustic reservoir having a pH greater than about 12 to remove substantially all of the remaining silicon halide and a portion of the hydrogen halide, passing said gas stream countercurrent to downflowing caustic having a pH greater than about 12 to remove all remaining hydrogen halide and any residual silicon halide and leave wet hydrogen, purifying said wet hydrogen and recycling said pure hydrogen to said reaction zone.

7. A method for treating a gas stream consisting of hydrogen and minor amounts of silicon halide and hydrogen halide that comprises the steps of bubbling said gas stream through a caustic reservoir having a pH greater than about 12 to remove substantially all of the silicon halide and a portion of the hydrogen halide, and passing said gas stream countercurrent to downflowing caustic having a pH greater than about 12 to remove all remaining hydrogen halide and any residual silicon halide and leave wet hydrogen.

8. A method according to claim 7 wherein said silicon halide is trichlorosilane and said hydrogen halide is hydrogen chloride.

9. A method for treating a gas stream consisting of hydrogen and minor amounts of silicon halide and hydrogen halide that comprises the steps of bubbling said gas stream through a caustic reservoir having a pH greater than about 12 to remove substantially all of the silicon halide and a portion of the hydrogen halide, passing said gas stream countercurrent to a downflowing percolating caustic stream having a pH greater than about 12 to remove all remaining hydrogen halide and any residual silicon halide and leave wet hydrogen and purifying said wet hydrogen.

References Cited in the file of this patent

UNITED STATES PATENTS

| | | |
|---|---|---|
| 1,020,103 | Von Linde | Mar. 12, 1912 |
| 1,286,088 | Pfanstiehl | Nov. 26, 1918 |
| 1,702,683 | Claude | Feb. 19, 1929 |
| 1,812,526 | Gross et al. | June 30, 1931 |
| 1,913,805 | Hausen | June 13, 1933 |
| 1,946,489 | De Jahn | Feb. 13, 1934 |
| 1,962,485 | Dely | June 12, 1934 |
| 2,225,131 | Reich | Dec. 17, 1940 |
| 2,315,424 | Hill et al. | Mar. 30, 1943 |
| 2,353,234 | Hachmuth | July 11, 1944 |
| 2,582,885 | Rosenblatt | Jan. 15, 1952 |
| 2,782,141 | King | Feb. 19, 1957 |
| 2,817,961 | O'Connell | Dec. 31, 1957 |
| 2,936,593 | Grumberg | May 17, 1960 |
| 3,020,128 | Adcock et al. | Feb. 6, 1962 |

FOREIGN PATENTS

| | | |
|---|---|---|
| 2,678 | Great Britain | 1875 |
| 543,923 | Great Britain | Mar. 19, 1942 |